United States Patent
Vayilapelli et al.

(10) Patent No.: US 10,212,685 B2
(45) Date of Patent: Feb. 19, 2019

(54) NETWORK MANAGEMENT OF SUBSCRIPTIONS FOR IOT DEVICES

(71) Applicant: QUALCOMM Incorporated, San Diego, CA (US)

(72) Inventors: Dileep Kumar Vayilapelli, Mandasa (IN); Pradeep Kumar Darisi, Hyderabad (IN); Rajendra Prasad Katakam, Hyderabad (IN); Ramprasad Katkam, Karimnagar (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/402,772

(22) Filed: Jan. 10, 2017

(65) Prior Publication Data
US 2018/0199303 A1    Jul. 12, 2018

(51) Int. Cl.
*H04W 4/00* (2018.01)
*H04W 60/04* (2009.01)
*H04W 68/02* (2009.01)
*H04W 8/04* (2009.01)
*H04W 12/04* (2009.01)
*H04W 12/06* (2009.01)
*H04L 29/08* (2006.01)
(Continued)

(52) U.S. Cl.
CPC .............. *H04W 60/04* (2013.01); *H04L 67/12* (2013.01); *H04W 8/04* (2013.01); *H04W 8/24* (2013.01); *H04W 8/265* (2013.01); *H04W 12/04* (2013.01); *H04W 12/06* (2013.01); *H04W 68/02* (2013.01); *H04W 8/186* (2013.01)

(58) Field of Classification Search
CPC ....... H04W 60/04; H04W 12/06; H04W 8/04; H04W 68/02; H04W 12/04; H04L 67/12
See application file for complete search history.

(56) References Cited

U.S. PATENT DOCUMENTS 9,026,082 B2 * 5/2015 Lindholm ............... H04W 8/26
                                                                          455/411
9,232,551 B2   1/2016 De et al.
(Continued)

FOREIGN PATENT DOCUMENTS

WO    WO-2012135680 A1   10/2012

OTHER PUBLICATIONS

To M., et al., "Aggregating Cellular Communication Lines for IoT Devices by Sharing IMSI", IEEE, ICC Mobile and Wireless Networking Symposium, 2016, pp. 1-7.
(Continued)

*Primary Examiner* — Ajit Patel
(74) *Attorney, Agent, or Firm* — Paradice and Li LLP

(57) ABSTRACT

Examples described herein relate to apparatuses and methods for a network to manage communications for a plurality of wireless communication devices including, but not limited to, registering, by the network, the plurality of wireless communication devices associated with a same subscription identifier, identifying, by the network, each of the plurality of wireless communication devices based, at least in part, on device capabilities associated with each of the plurality of wireless communication devices, and routing, by the network, communications to or from each of the plurality of wireless communication devices based, at least in part, on the device capabilities.

29 Claims, 7 Drawing Sheets

(51) Int. Cl.
    *H04W 8/24*     (2009.01)
    *H04W 8/26*     (2009.01)
    *H04W 8/18*     (2009.01)

(56) References Cited

U.S. PATENT DOCUMENTS

| | | | | |
|---|---|---|---|---|
| 9,313,806 | B2 | 4/2016 | Zakrzewski | |
| 9,794,905 | B1* | 10/2017 | Chastain | H04W 60/04 |
| 2011/0053619 | A1* | 3/2011 | Shaheen | H04W 4/00 |
| | | | | 455/466 |
| 2013/0188515 | A1* | 7/2013 | Pinheiro | H04W 4/001 |
| | | | | 370/254 |
| 2015/0078173 | A1* | 3/2015 | Javed | H04W 24/08 |
| | | | | 370/241 |
| 2015/0173111 | A1* | 6/2015 | Agarwal | H04W 8/04 |
| | | | | 370/329 |
| 2016/0037340 | A1 | 2/2016 | Rayment et al. | |
| 2016/0192277 | A1* | 6/2016 | Starsinic | H04L 63/105 |
| | | | | 370/329 |
| 2016/0262190 | A1* | 9/2016 | Bitar | H04W 76/022 |
| 2017/0235585 | A1* | 8/2017 | Gupta | G06F 9/45558 |
| | | | | 718/1 |
| 2017/0237798 | A1* | 8/2017 | Li | H04L 65/80 |
| | | | | 370/221 |
| 2017/0238236 | A1* | 8/2017 | Miller | H04W 48/02 |
| | | | | 370/338 |

OTHER PUBLICATIONS

Interdigital Communications et al., "Options to Handle Alternatives to E.164 Numbers in Machine Type Communications", 3GPP Draft; S1-101007, 3rd Generation Partnership Project (3GPP), Mobile Competence Centre; 650, Route Des Lucioles; F-06921 Sophia-Antipolis Cedex; France, vol. SA WG1, No. Nice; May 10, 2010, Apr. 30, 2010, XP050431841, [retrieved on Apr. 30, 2010], 6 pages.
International Search Report and Written Opinion—PCT/US2017/063124—ISA/EPO—dated Mar. 14, 2018.
MTC Identifier: "Catt", 3GPP Draft; S2-102140, 3rd Generation Partnership Project (3GPP), Mobile Competence Centre; 650, Route Des Lucioles; F-06921 Sophia-Antipolis Cedex; France, vol. SA WG2, No. Kyoto; May 10, 2010, May 5, 2010, XP050434777, [retrieved on Mat 5, 2010], 3 pages.

* cited by examiner

NETWORK MANAGEMENT OF SUBSCRIPTIONS FOR IOT DEVICES

BACKGROUND

Technology relating to the Internet-of-Things (IoT) devices allows various devices such as home appliances (e.g., power/water meters, televisions, refrigerators, lighting, or the like), smart watches, automobiles, and other types of electronic devices to be connected to a cellular network (e.g., the 3rd Generation Partnership Project (3GPP) network) for always-ON connectivity. Currently, each IoT device, including devices belonging to the same user, requires a separate subscription to be connected to the network. Each separate subscription is identified by a different International Mobile Subscriber Identity (IMSI) and enabled by a different physical Subscriber Identity Module (SIM) card or a virtual SIM. However, a user may have multiple devices (e.g., a smartphone and one or more IoT devices) to be registered to the network, where each device requires a different subscription. An increase in the number of subscriptions that the network needs to manage can be directly proportional to the increase in the number of IoT devices. Thus, due to the recent trend of each user owning an increasing number of IoT devices, registering each IoT device belonging to the same user using a different subscription (e.g., different IMSIs) for each device can considerably increase overhead and congestion for the network.

Currently, communication networks fail to adequately support registering two or more communication devices with a same IMSI. For example, during the authentication procedures, a network identifies different devices with different IMSIs and cannot distinguish different devices with a same IMSI. In addition, the network is currently not capable of determining device capabilities of two or more devices with a same IMSI. Furthermore, paging occasions are assigned based on the IMSI. Thus, paging collisions can be pervasive.

SUMMARY

Examples described herein relate to apparatus and methods for registering and managing communications for two or more wireless communication devices using a same International Mobile Subscriber Identity (IMSI). Each of the two or more wireless communication devices is assigned a different International Mobile Equipment Identity (IMEI)). A first wireless communication device of the two or more wireless communication devices may be a main device (e.g., a smart phone, tablet, or the like) having a physical/virtual Subscriber Identity Module (SIM) corresponding to the IMSI. A second wireless communication device of the two or more wireless communication devices is an Internet-of-Things (IoT) device having a virtual SIM corresponding to the same IMSI. The network determines and stores one or more of a Globally Unique Temporary User Equipment (UE) Identity (GUTI), Internet Protocol (IP) address, or device capabilities with respect to each of the two or more wireless communication devices. Each of the two or more wireless communication devices is associated with a different GUTI and a different IP address. Device capabilities refer to whether a device is voice-capable, data-capable, or both. The network routes voice or data to or from the two or more wireless communication devices based on one or more of the GUTI, IP address, or device capabilities. In some arrangements, a mapping representing a correspondence between GUTI, IP address, and device capabilities may be used to identify each wireless communication device for routing of voice or data. In addition, the network can determine at least one of a Paging Occasion (PO) or Paging Frame (PF) for each of the two or more wireless communication devices based on the GUTI.

In some examples, a method for a network to manage communications for a plurality of wireless communication devices includes registering, by the network, the plurality of wireless communication devices associated with a same subscription identifier, identifying, by the network, each of the plurality of wireless communication devices based, at least in part, on device capabilities associated with each of the plurality of wireless communication devices, and routing, by the network, communications to or from each of the plurality of wireless communication devices based, at least in part, on the device capabilities.

In some examples, the subscription identifier is an IMSI, the network includes an Evolved Packet Core (EPC), and the network is associated with a processor of one or more of a Mobility Management Entity (MME) or a Home Subscriber Server (HSS).

In some examples, registering the plurality of wireless communication devices associated with the same subscription identifier includes determining, during an initial attach, a different GUTI for each of the plurality of wireless communication devices and a different IP address for each of the plurality of wireless communication devices.

In some examples, registering the plurality of wireless communication devices associated with the same subscription identifier includes receiving, by the network, an attach request message from each of the plurality of wireless communication devices, wherein the attach request includes the subscription identifier, and determining, by the network, a different GUTI for each of the plurality of wireless communication devices.

In some examples, the method further includes sending the different GUTI to each of the plurality of wireless communication devices in an attachment accept message, wherein a processor associated with one or more of a MME or a HSS of the network determines the different GUTI for each of the plurality of wireless communication devices In some examples, registering the plurality of wireless communication devices associated with the same subscription identifier includes authenticating the plurality of wireless communication devices using a same authentication key associated with the subscription identifier.

In some examples, registering the plurality of wireless communication devices associated with the same subscription identifier includes receiving, by the network, a request for Packet Data Network (PDN) connection from each of the plurality of wireless communication devices, and determining, by the network, a different IP address for each of the plurality of wireless communication devices.

In some examples, the method further includes sending the different IP address to each of the plurality of wireless communication devices, wherein a processor associated with a PDN Gateway (P-GW) of the network determines the different IP address for each of the plurality of wireless communication devices In some examples, the device capabilities associated with each of the plurality of wireless communication devices includes voice-capable and data-capable.

In some examples, a first wireless communication device of the plurality of wireless communication devices is both voice-capable and data-capable.

In some examples, a second wireless communication device of the plurality of wireless communication devices is data-capable and not voice-capable.

In some examples, the second wireless communication device has a virtual SIM associated with the same subscription identifier, and the second wireless communication device is an Internet-of-Things (IoT) device.

In some examples, identifying each of the plurality of wireless communication devices based, at least in part, on the device capabilities associated with each of the plurality of wireless communication devices includes identifying each of the plurality of wireless communication devices based on a combination of a GUTI, IP address, and device capabilities.

In some examples, identifying each of the plurality of wireless communication devices based on a combination of the GUTI, IP address, and device capabilities includes determining a mapping of the GUTI, IP address, and device capabilities, wherein each of the plurality of wireless communication devices is identified based on the mapping.

In some examples, identifying each of the plurality of wireless communication devices based, at least in part, on the device capabilities associated with each of the plurality of wireless communication devices further includes storing the mapping in a memory associated with one or more of a MME or a HSS of the network.

In some examples, routing the communications to or from each of the plurality of wireless communication devices based, at least in part, on the device capabilities includes routing the communications to or from each of the plurality of wireless communication devices based on the mapping of the GUTI, IP address, and device capabilities.

In some examples, routing the communications to or from each of the plurality of wireless communication devices based, at least in part, on the device capabilities includes receiving, by the network, a Mobile Originated (MO) voice call from a first wireless communication device of the plurality of wireless communication devices, determining that the first wireless communication device of the plurality of wireless communication devices is voice-capable while all other wireless communication devices of the plurality of wireless communication devices are not voice-capable, routing the MO voice call from the first wireless communication device.

In some examples, routing the communications to or from each of the plurality of wireless communication devices based, at least in part, on the device capabilities includes receiving, by the network, a Mobile Terminated (MT) voice call, determining, by the network, that a first wireless communication device of the plurality of wireless communication devices is voice-capable while all other wireless communication devices of the plurality of wireless communication devices are not voice-capable, determining, by the network based on the mapping, one or more of a first GUTI or a first IP address associated with the first wireless communication device, and routing the MT voice call to the first wireless communication device using one or more of the first GUTI or first IP address.

In some examples, routing the communications to or from each of the plurality of wireless communication devices based, at least in part, on the device capabilities includes receiving, by the network, a MO data transfer from a second wireless communication device of the plurality of wireless communication devices, wherein the data transfer is associated with a second IP address, and routing the MO data transfer from the second wireless communication device using the second IP address.

In some examples, routing the communications to or from each of the plurality of wireless communication devices based, at least in part, on the device capabilities includes receiving, by the network, a MT data transfer associated with a second IP address, determining, by the network, a second GUTI based on the second IP address, and routing the MT data transfer to a second wireless communication device of the plurality of wireless communication devices using one or more of the second GUTI or second IP address.

According to various examples, a network system for managing communications for a plurality of wireless communication devices includes a processor configured to register the plurality of wireless communication devices associated with a same subscription identifier, identify each of the plurality of wireless communication devices based, at least in part, on device capabilities associated with each of the plurality of wireless communication devices, and route communications to or from each of the plurality of wireless communication devices based, at least in part, on the device capabilities, and a memory.

In some examples, a method for a network to manage communications for a plurality of wireless communication devices includes mapping, by the network, one or more of a GUTI, IP address, or device capabilities to identify each of the plurality of wireless communication devices associated with a same subscription identifier, and routing, by the network, communications to or from each of the plurality of wireless communication devices based, at least in part, on the mapping.

In some examples, the method further includes determining, during an initial attach, a different GUTI for each of the plurality of wireless communication devices and a different IP address for each of the plurality of wireless communication devices.

In some examples, the method further includes registering the plurality of wireless communication devices associated with the same subscription identifier by receiving, by the network, an attach request message from each of the plurality of wireless communication devices, wherein the attach request includes the subscription identifier, and determining, by the network, a different GUTI for each of the plurality of wireless communication devices.

In some examples, registering the plurality of wireless communication devices associated with the same subscription identifier further includes authenticating the plurality of wireless communication devices using a same authentication key associated with the subscription identifier.

In some examples, the method further includes registering the plurality of wireless communication devices associated with the same subscription identifier by receiving, by the network, a request for PDN connection from each of the plurality of wireless communication devices, and determining, by the network, a different IP address for each of the plurality of wireless communication devices.

In some examples, the device capabilities associated with each of the plurality of wireless communication devices includes voice-capable and data-capable.

In some examples, the method further includes determining at least one of a PO or PF based on the GUTI.

In some examples, a network system for managing communications for a plurality of wireless communication devices includes a databased configured to store a mapping of one or more of a GUTI, IP address, or device capabilities to identify each of the plurality of wireless communication devices associated with a same subscription identifier, and a processor configured to routing communications to or from each of the plurality of wireless communication devices based, at least in part, on the mapping.

BRIEF DESCRIPTION OF THE DRAWINGS

The accompanying drawings, which are incorporated herein and constitute part of this specification, illustrate exemplary examples of the disclosure, and together with the general description given above and the detailed description given below, serve to explain the features of the various examples.

DETAILED DESCRIPTION

Figure 1:
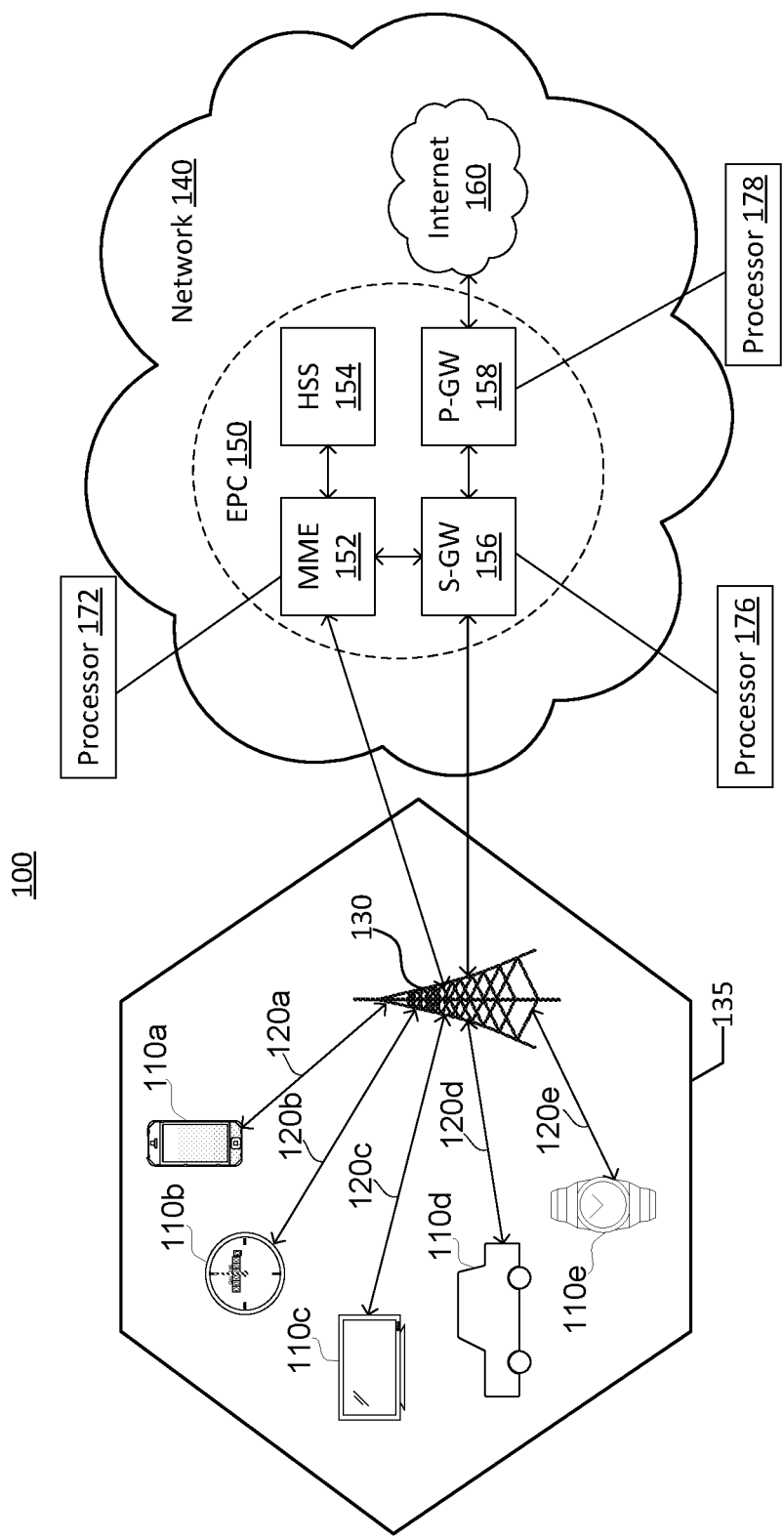
FIG. 1 is a schematic diagram of a communication system in accordance with various examples.

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

A modern communication device, referred to herein as a wireless communication device, User Equipment (UE), or Mobile Station (MS), may be a cellular telephone, smart phone, personal or mobile multi-media player, personal data assistant, laptop computer, personal computer, tablet computer, smart book, palm-top computer, wireless electronic mail receiver, multimedia Internet-enabled cellular telephone, wireless gaming controller, or similar personal electronic device. In further examples, the wireless communication device may be an Internet-of-Things (IoT) device associated with a home appliance, smart wearable (e.g., a smart watch, wristband, or the like), automobile, and other types of electronic devices. Such a wireless communication device may include at least one physical or virtual Subscriber Identity Module (SIM), a programmable processor, memory, and circuitry for connecting to a mobile communication network.

A wireless communication device may include one or more SIMs that enable access to one or multiple separate mobile communication networks. The access to a mobile communication network may be facilitated by Radio Access Technologies (RATs). The wireless communication device may be configured to connect to one or more base stations via one or more RATs. Examples of RATs include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with a subscription or SIM.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless communication device on a network and enable communication services with the network. A SIM as referred to herein may be a physical SIM, virtual SIM, soft SIM, or the like. Because the information stored in a SIM may be used to establish a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another, vice versa.

Referring Generally to the FIGS., examples described herein relate to registering multiple wireless communication devices (including a first wireless communication device and a second wireless communication device) belonging to a same user. The first wireless communication device may be a main device (e.g., a smart phone, tablet, or the like) having a physical/virtual SIM corresponding to a given subscription identifier (e.g., a given IMSI). The second wireless communication device may be an IoT device having a virtual SIM that can be programmed or otherwise configured to use the same IMSI as that of the first wireless communication device. The network may be capable of registering and handling multiple authentication requests from different wireless communication devices, each of which has different device identifiers such as, but not limited to, a different International Mobile Equipment Identities (IMEI). Each wireless communication device may be authenticated with a same authentication key corresponding to the same IMSI.

In some examples, the network can store parameters such as, but not limited to, the IMSI, Globally Unique Temporary User Device (UE) Identity (GUTI), IP address, and device capabilities with respect to each wireless communication device corresponding to the same IMSI. The GUTI may be a unique temporary identifier assigned by the network to a wireless communication device as the device registers with the network during an initial attach to the network. Each wireless communication device may be uniquely identified by different GUTIs. During the registration process, the network may assign a unique IP address to each wireless communication device. During the registration process, each wireless communication device may report device capabilities (e.g., voice-capable, data-capable, or both) to the network. The network may be capable of determining and storing a mapping of the above-mentioned parameters.

Based on the mapping, the network can route voice and/or data to or from the wireless communication device. Illustrating with a non-limiting example, for a Mobile Originated (MO), outgoing voice call, the network may identify the wireless communication device (e.g., the first wireless communication device that is voice-capable) by the device capabilities, given that only the first wireless communication device (e.g., a smart phone) is voice-capable according to the mapping. For a Mobile Terminated (MT) voice call, the network (e.g., the Mobility Management Entity (MME)) may route the voice call to the first wireless communication device by the device capabilities, given that that only the first wireless communication device is voice-capable according to the mapping.

With respect to MO data, data is routed using a particular unique IP address assigned to each device. Thus, the source of MO data can be identified by the IP address, which is the same IP address as the one that the wireless communication device receives from the network during the initial attach. Similarly, with respect to MT data, the Packet Data Network (PDN) Gateway (P-GW) may forward the MT data to a corresponding Serving Gateway (S-GW) using a destination IP address. In particular, the MME/Home Subscriber Server (HSS) can route IP data packets to the base station (eNB) associated with the destination device (e.g., one of the wireless communication devices that is data-capable) from the S-GW using the IP address to GUTI mapping available to the HSS.

For paging one or more of the wireless communication devices, the network may determine a Paging Occasion (PO) or Paging Frame (PF) based on the unique GUTIs instead of based on the IMSI, to avoid paging collision.

Various examples may be implemented within a communication system 100, an example of which is illustrated in FIG. 1. Referring to FIG. 1, a base station 130 may provide access to a network 140. The network 140 may be a 3rd Generation Partnership Project (3GPP) network. The base station 130 may enable the network 140 in a cell 135. Wireless communication devices 110a-110e may be associated with (within effective boundaries of) the cell 135. In some examples, the wireless communication devices 110a-110e may belong to a same user. In other examples, two or more of the wireless communication devices 110a-110e may belong to different users.

The wireless communication devices 110a-110e may have SIMs (e.g., a physical SIM, virtual SIM, or the like) associated with a same subscription identifier (e.g., a same IMSI). Accordingly, the wireless communication devices 110a-110e use a same subscription for sending and receiving voice or data with the network 140. In some examples, a first wireless communication device 110a may be a main device (e.g., a smart phone, tablet, or the like) having a SIM (e.g., a physical SIM) corresponding to the IMSI. A second wireless communication device 110b, 110c, 110d, or 110e may be an IoT device having a SIM (e.g., a virtual SIM) corresponding to the same IMSI. For instance, the virtual SIM may be programmed with the corresponding instructions and parameters to function like a SIM.

Illustrating with a non-limiting example shown in FIG. 1, the second wireless communication device 110b may be a utility meter (e.g., a water meter, gas meter, electricity meter, or the like). The second wireless communication device 110c may be an appliance (e.g., a television, refrigerator, over, stove, air conditioning, microwave oven, lights, alarms, or the like). The second wireless communication device 110d may be a vehicle (e.g., a car, truck, train, bus, boat, airplane, military vehicle, or the like). The second wireless communication device 110e may be a smart wearable (e.g., a digital wristband, smart watch, smart glasses, or the like).

Each of the wireless communication devices 110a-110e may be in communication with the network 140 through a respective one of cellular connections 120a-120e to the base station 130. For instance, each of the cellular connections 120a-120e may be a two-way wireless communication link. Each of the cellular connections 120a-120e may be enabled by any suitable protocol (RAT) including, but not limited to, FDMA, TDMA, CDMA (e.g., EVDO), UMTS (e.g., WCDMA, LTE, HSDPA, or the like), GSM, 1x, GPRS, Wi-Fi, PCS, and/or another protocol used in a wireless communications network or a data communications network. By way of illustrating with a non-limiting example, each of the cellular connections 120a-120e may include a LTE connection. Other RATs may be implemented in a similar manner.

In some examples, the base station 130 may be an access point, Node B, evolved Node B (eNodeB or eNB), Base Transceiver Station (BTS), or the like. The base station 130 may be in communication with the network 140 over one or more wired or wireless connections. The base station 130 may include at least one antenna group or transmission station located in a same or different areas. The at least one antenna group or transmission station may facilitate signal transmission and reception. The base station 130 may include one or more processors, modulators, multiplexers, demodulators, demultiplexers, antennas, memories, and/or the like for performing the functions described herein.

The network 140 is shown to include an Evolved Packet Core (EPC) 150 and the Internet 160. The EPC 150 is sometimes referred to as a core network that facilitates the routing of data from the Internet 160 to the base station 130 (and thus to the wireless communication devices 110a-110e). The EPC 150 may be at least a MME 152, HSS 154, S-GW 156, and P-GW 158.

The MME 152 may be a control node that processes the signaling between base station 130 (and the wireless communication devices 110a-110e) and the EPC 150. Generally, the MME 152 may provide bearer/connection management, and may be responsible for facilitating attachment (e.g., initial attach) of one or more of the wireless communication devices 110a-110e to the network 140. During an attachment process, the MME 152 may assign a unique GUTI to each of the wireless communication devices 110a-110e. The MME 152 may be communicably coupled to the HSS 154, which includes a database that stores subscriber profile information associated with user subscriptions. In some examples, the MME 152 interfaces with the HSS 154 to authenticate one or more of the wireless communication devices 110a-110e by checking against information stored in the HSS 154. As described herein, the HSS 154 may store the correspondence (e.g., a mapping) of one or more of the GUTI, IP address, and device capabilities for route data to or from one or more of the wireless communication devices 110a-110e.

The S-GW 156 may serve as a gateway for IP data packets transfer between the base station 130 and the P-GW 158. The P-GW 158 may allocate IP address allocation for the wireless communication devices 110a-110e. For example, a device requests a PDN connection when the device initially attaches to the network 140. The P-GW 158 allocates a PDN address (e.g., IP address) for the device and relays the PDN address to the device as a default bearer connecting the device and the PDN is being established. The device can utilize this allocated IP address for services provided by the PDN. The P-GW 158 may be connected to an Operator's Service or PDN (e.g., the Internet 160). Other examples of the Operator's Service include, but not limited to, an Intranet, IP Multimedia Subsystem (IMS), a Packet Switch (PS) Streaming Service (PSS), and the like.

In some arrangements, one or more processors (e.g., a processor 172, processor 176, or processor 178) may be provided to a respective one of the MME 152, S-GW 156, or P-GW 158 for performing processes described herein. One or more of the processor 172, processor 176, or processor 178 may include any suitable data processing device, such as a microprocessor. In the alternative, one or more of the processor 172, processor 176, or processor 178 may be any suitable electronic processor, controller, microcontroller, or state machine. One or more of the processor 172, processor 176, or processor 178 may be implemented as a combination of computing devices (e.g., a combination of a Digital Signal Processor (DSP) and a microprocessor, a plurality of microprocessors, at least one microprocessor in conjunction with a DSP core, or any other such configuration).

Each of the processor 172, processor 176, or processor 178 may be coupled to a non-transitory processor-readable storage medium (not shown) that stores processor-executable instructions. Such memory may include any suitable internal or external device for storing software and data (e.g., application data, such as an array data structure). The MME 152, HSS 154, S-GW 156, or P-GW 158 may each include networking capabilities such as those described herein for communication therebetween.

While each of the wireless communication devices 110a-110e is shown to be connected to the network 140 via a cellular connection, in other examples (not shown), each of the wireless communication devices 110a-110e may establish additional network connections with the same or different network using at least one additional RAT.

In some examples, each of the wireless communication devices 110a-110e may establish a wireless connection with a peripheral device (not shown) used in connection with a respective one of the wireless communication devices 110a-110e. For example, each of the wireless communication devices 110a-110e may communicate over a Bluetooth® link with one another or with a Bluetooth-enabled personal computing device. In some examples, each of the wireless communication devices 110a-110e may establish a wireless connection with a wireless access point (not shown), such as over a Wi-Fi connection. The wireless access point may be configured to connect to the Internet 160 or another network over a wired connection.

Figure 2:
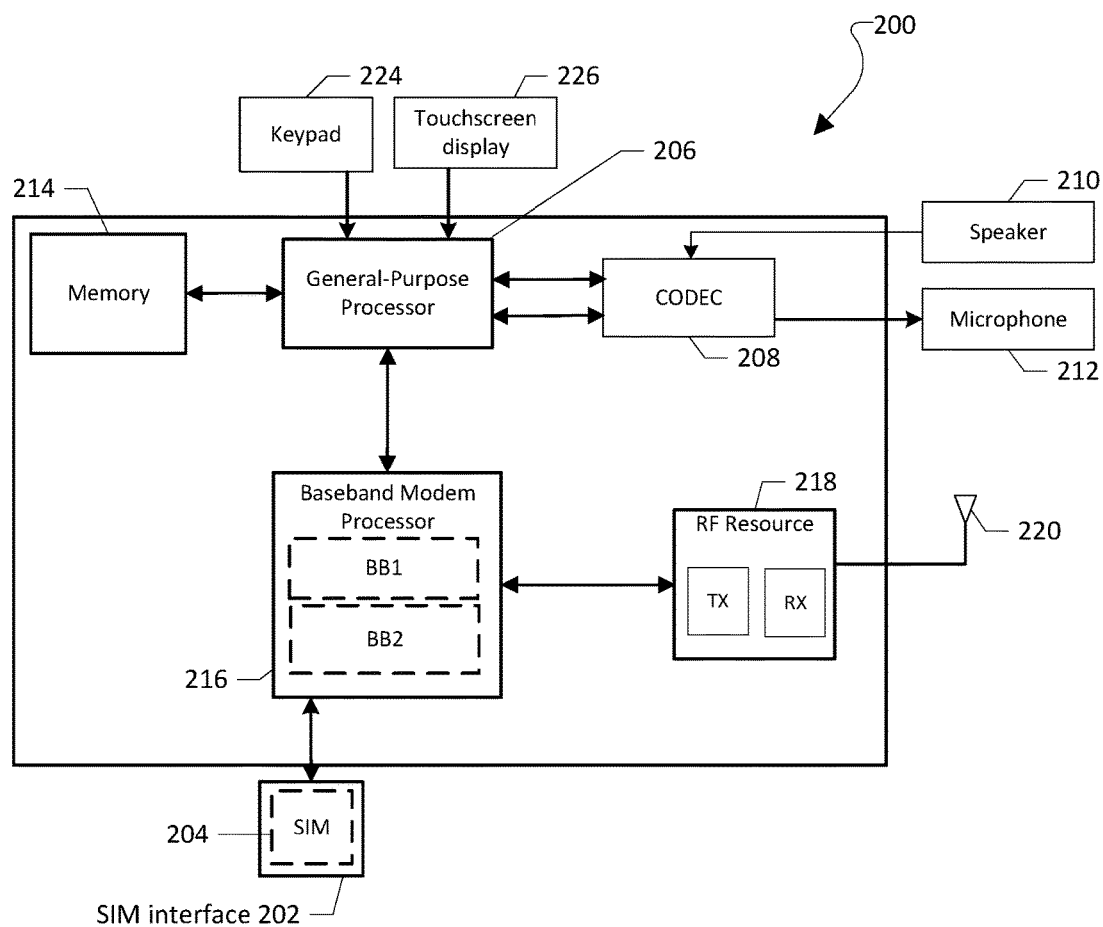
FIG. 2 is a component block diagram of a wireless communication device according to various examples.

FIG. 2 is a functional block diagram of a wireless communication device 200 suitable for implementing various examples. According to various examples, each of the wireless communication devices 110a-110e as described with reference to FIG. 1 may be the wireless communication device 200. Referring to FIGS. 1-2, the wireless communication device 200 may include a SIM interface 202, which may receive a SIM 204 that is associated with a subscription corresponding to the network 140.

A SIM (e.g., the SIM 204) in various examples may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have one or more of a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. In some examples in which the wireless communication device 200 is the first wireless communication device 110a, a physical SIM corresponding to a subscription identifier (e.g., an IMSI) is provided. In alternative examples in which the wireless communication device 200 is the first wireless communication device 110a, a virtual SIM or a soft SIM corresponding to the subscription identifier is provided.

In some examples, the SIM may be a virtual SIM or soft SIM that is implemented within a portion of memory (e.g., the memory 214) of the wireless communication device 200, and thus need not be a separate or removable circuit, chip, or card. In such examples, the SIM interface 202 may not be needed. In some examples in which the wireless communication device 200 is the second wireless communication device 110b, 110c, 110d, or 110e, a virtual SIM or a soft SIM corresponding to the same subscription identifier is provided.

A SIM used in various examples may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home Public Land Mobile Network (PLMN) (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a DSP and a microprocessor, a plurality of microprocessors, at least one microprocessor in conjunction with a DSP core, or any other such configuration).

The memory 214 may include a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIM 204 in the wireless communication device 200 may be associated with at least one baseband-RF resource chain. A baseband-RF resource chain may include the baseband modem processor 216, which may perform baseband/modem functions for communications on the SIM. The baseband modem processor 216 may include one or more amplifiers and radios, referred to generally herein as a RF resource 218 or RF chain.

The RF resource 218 may include at least one transceiver that perform transmit/receive functions for the associated SIM 204. The RF resource 218 may include separate transmit and receive circuitry, or may include a transceiver that combines transmitter and receiver functions. The RF resource 218 may be coupled to a wireless antenna 220. The RF resource 218 may be communicably coupled to the baseband modem processor 216.

In some examples, the general-purpose processor 206, the memory 214, the baseband modem processor 216, and the RF resource 218 may be included in the wireless communication device 200 as a system-on-chip. In some examples, the SIM 204 and its corresponding interface 202 may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing voice call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communications therebetween. The voice call features are enabled for the wireless communication device 200 that is the first wireless communication device 110a, which is voice-capable. With respect to the wireless communication device 200 representing one of the second wireless communication devices 110b-110e (e.g., the IoT devices), the voice call features are not enabled.

Hardware and/or software for the functions may be incorporated in the wireless communication device 200 during manufacturing, for example, as a part of a configuration of an original equipment manufacturer (OEM) of the wireless communication device 200. In further examples, such hardware and/or software may be added to the wireless communication device 200 post-manufacture, such as by installing one or more hardware devices and/or software applications onto the wireless communication device 200.

In some examples, the wireless communication device 200 may include, among other things, at least one additional SIM, at least one additional SIM interface, at least additional RF resource associated with the additional SIM, and additional antenna for connecting to additional mobile networks.

Figure 3:
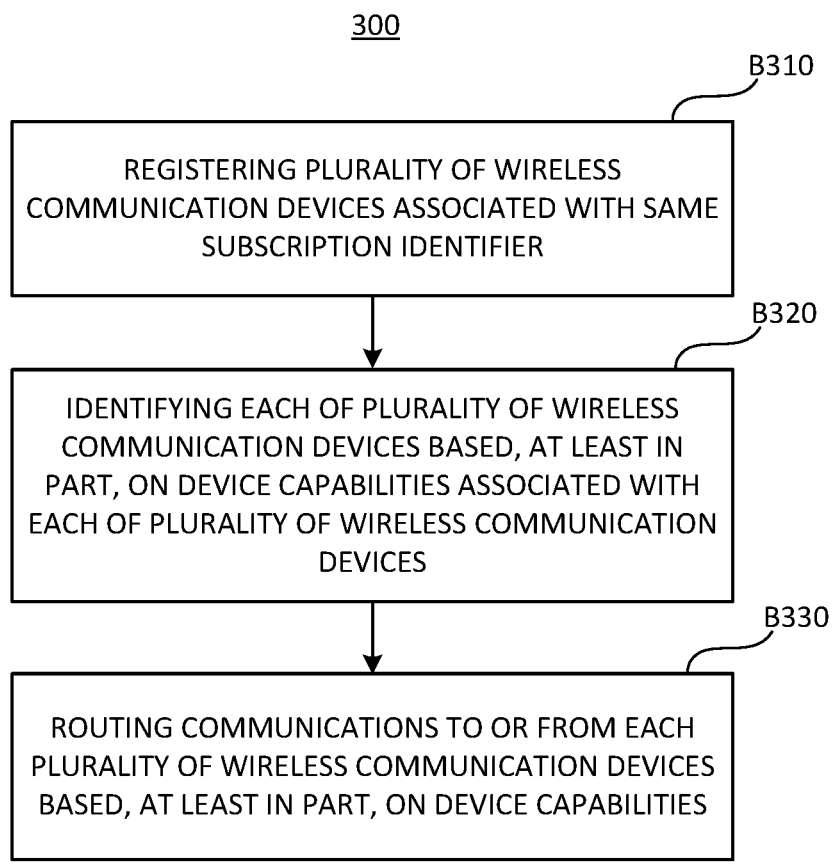
FIG. 3 is process flowchart diagram illustrating a subscription management method according to various examples.

FIG. 3 is a process flowchart diagram illustrating a subscription management method 300 according to various examples. Referring to FIGS. 1-3, in some examples, one or more processors (e.g., one or more of the processors 172, 176, or 178) associated with the network 140 (e.g., with the EPC 150) may be capable of performing the subscription management method 300. Generally, implementation of the subscription management method 300 by the network 140 allows for registering and authenticating multiple devices (e.g., two or more of the devices 110a-110e) with the same subscription, identifying each of the registered devices based, at least in part, on device capabilities, and routing communications to or from the devices based, at least in part, on the device capabilities. Aspects of the subscription management method 300 may be described in additional detail relative to FIGS. 4A-7.

At block B310, at least one processor associated with the network 140 may register a plurality of wireless communication devices (e.g., two or more of the wireless communication devices 110a-110e) associated with the same subscription identifier (e.g., a same IMSI) with the network 140. The plurality of wireless communication devices may include the first wireless communication device 110a and at least one of the second wireless communication devices 110b-110e. In other words, the network 140 is capable of handling one attachment from a voice/data-centric device (e.g., the first wireless communication device 110a) and one or more data-centric devices (e.g., the second wireless communication devices 110b-110e), all with the same IMSI. Block B310 may refer to the plurality of wireless communication devices being successfully attached, registered, and authenticated with the network 140.

In some examples, registering the devices includes determining a unique GUTI for each device, determining a unique IP address for each device, authenticating the devices, and/or the like. In some examples, registering the devices further includes receiving a device capabilities message from the plurality of wireless communication devices during the initial attach. The device capabilities message may be included any suitable signaling message such as, but not limited to, the attach request message, configuration or reconfiguration message, or another message during the initial attach in which device information is sent by the wireless communication devices to the network 140.

In some examples, the network 140 can support simultaneous authentication of two or more wireless communication devices with a same authentication key. The same authentication key is associated with the same IMSI. Given that the devices can be distinguished by a combination of GUTI, IP address, and device capabilities in the manner described, the network 140 (e.g., the MME 152 and the HSS 154) can allow authentication of two or more wireless communication devices with the same IMSI at the same time.

At block B320, at least one processor associated with the network 140 may identify each of the plurality of wireless communication devices based, at least in part, on device capabilities associated with each of the plurality of wireless communication devices. Device capabilities may refer to whether a device is voice-capable, data-capable, or both. For instance, the first wireless communication device 110a is both voice-capable and data-capable. Each of the second wireless communication devices 110b-110e is an IoT device that is data-capable but not voice-capable.

In some examples, each of the plurality of wireless communication devices having the same IMSI may be identified based on a combination of GUTI, IP address, and device capabilities in the manner described herein. A mapping representing the correspondence between the GUTI, IP address, and device capabilities may be determined and/or stored by the MME 152 and the HSS 154 in the manner described. The GUTIs may be unique for each of the plurality of wireless communication devices. Likewise, the IP addresses may be unique for each of the plurality of wireless communication devices.

At block B330, at least one processor associated with the network 140 may route communications to or from each of the plurality of wireless communication devices based, at least in part, on the device capabilities. In some examples, communications to or from each of the plurality of wireless communication devices having the same IMSI may be routed based on a combination of GUTI, IP address, and device capabilities in the manner described herein.

Figure 4A:
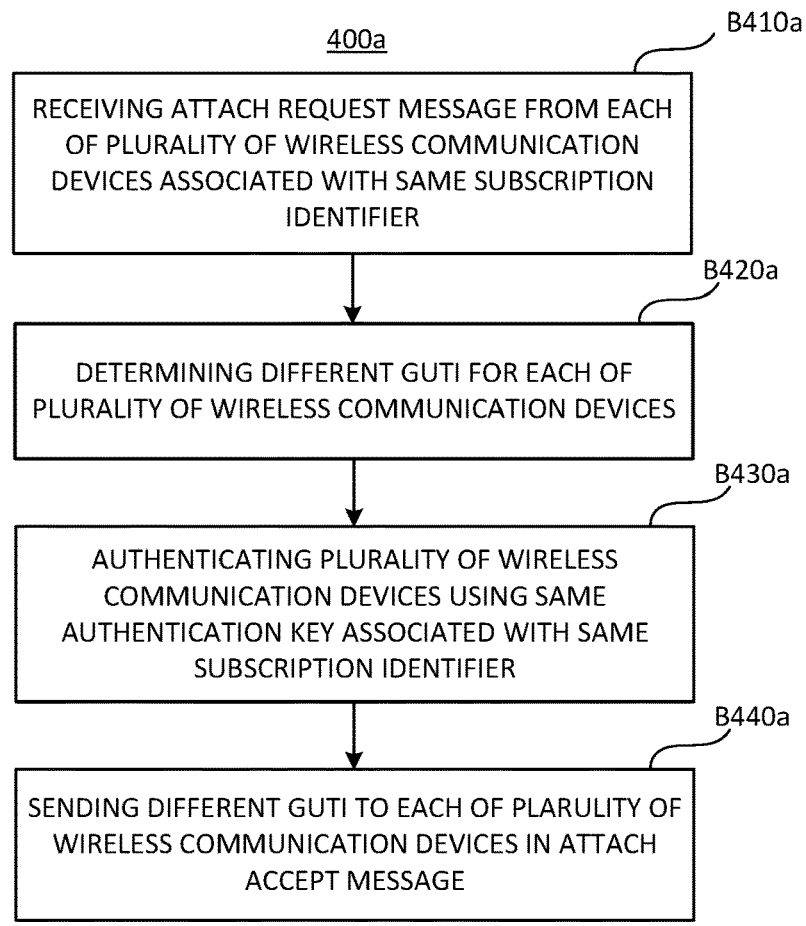
FIG. 4A is a process flowchart diagram illustrating a registration method according to various examples.

FIG. 4A is a process flowchart diagram illustrating a registration method 400a according to various examples. Referring to FIGS. 1-4A, in some examples, one or more processors (e.g., one or more of the processors 172, 176, or 178) associated with the network 140 (e.g., with the EPC 150) may be capable of performing the registration method 400a. The registration method 400a may be an example of a particular implementation of block B310. Generally, the registration method 400a includes determining a different GUTI for each of the plurality of wireless communication devices associated with the same subscription identifier (e.g., the same IMSI), and authenticating the plurality of wireless communication devices.

At block B410a, the network 140 (e.g., the EPC 150) may receive an attach request message from each of the plurality of wireless communication devices associated with the same subscription identifier (e.g., the same IMSI). The plurality of wireless communication devices refers to two or more of the wireless communication devices 110a-110e. The plurality of wireless communication devices may include the first wireless communication device 110a and at least one of the second wireless communication devices 110b-110e.

Illustrating with a non-limiting example, each of the plurality of wireless communication devices may initiate an initial attach procedure with the network 140 by sending the attach request message to the base station 130. The base station 130 may relay the attach request message to the MME 152. In some examples, the attach request message includes a device capabilities message indicating the device capabilities of the respective device. Upon receiving the device capabilities message, the processor 172 of the MME 152 may store the device capabilities indicated in the device capabilities message to a memory (not shown) associated with the MME 152 and/or relay the device capabilities message to the HHS 154. In some examples, the attach request message may include the IMSI and one or more of a Mobile Network Code (MNC), Mobile Country Code (MCC).

At block B420a, at least one processor associated with the network 140 may determine a different GUTI for each of the plurality of wireless communication devices. In some examples, block B420a may be performed in response to receiving the attach request message for each respective wireless communication device. The processor 172 of the MME 152 may allocate a unique GUTI for a wireless communication device in response to receiving the attach request message from that wireless communication device. The GUTI uniquely identifies the corresponding wireless communication device without revealing identity information of the corresponding wireless communication device.

At block B430a, at least one processor associated with the network 140 may authenticate the plurality of wireless communication devices using a same authentication key associated with the same subscription identifier. In some examples, the processor 172 of the MME 152 interfaces with the HSS 154 to authenticate the plurality of wireless communication devices. For instance, the processor 172 may send an authentication information request to the HSS 154, where subscriber (subscription) identity information is stored. The authentication information request may include one or more of the IMSI, device capabilities message, or other security parameters such as, but not limited to, MNC, MCC, or the like. The HSS 154 (and the processor 172) allows two devices with the same IMSI to be authenticated simultaneously, with the same authentication key associated with the same IMSI. In other words, the HSS 154 does not automatically deny the authentication information request only because there are two devices with the same IMSI that is either attached or is about to be attached to the network 140 at a given moment in time. The HSS 154 may return an authentication information answer to the MME 152 in response to authenticating a wireless communication device. The HSS 154 may store the GUTI and/or the device capabilities upon reception from the MME 152.

At block B440a, at least one processor associated with the network 140 may send a different GUTI to each of the plurality of wireless communication devices in an attach accept message. For instance, the processor 172 of the MME 152 may send to the base station 130 the attach accept message, which includes the unique GUTI that the respective, authenticated wireless communication device can use instead of the IMSI.

Figure 4B:
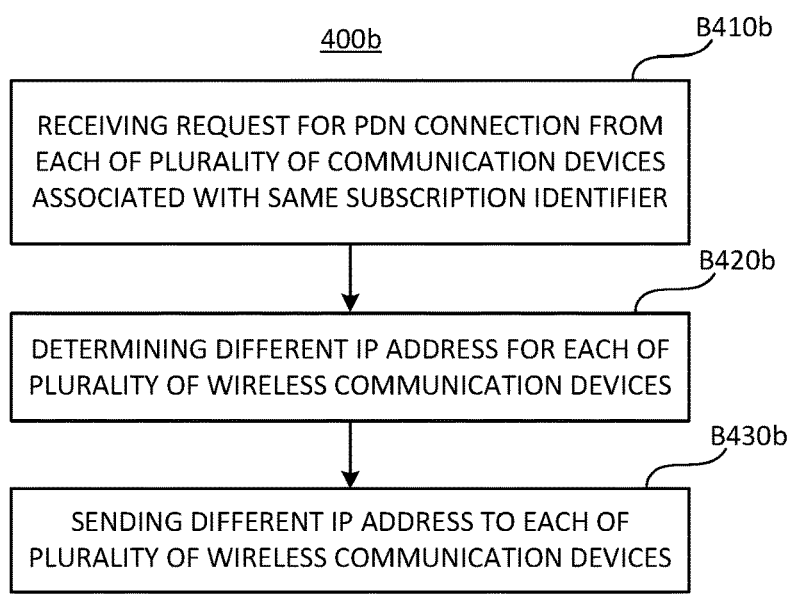
FIG. 4B is a process flowchart diagram illustrating a registration method according to various examples.

FIG. 4B is a process flowchart diagram illustrating a registration method 400b according to various examples. Referring to FIGS. 1-4B, in some examples, one or more processors (e.g., one or more of the processors 172, 176, or 178) associated with the network 140 (e.g., with the EPC 150) may be capable of performing the registration method 400b. The registration method 400b may be an example of a particular implementation of block B310. Generally, the registration method 400b includes determining a different IP address for each of the plurality of wireless communication devices associated with the same subscription identifier (e.g., the same IMSI).

At block B410b, the network 140 (e.g., the EPC 150) may receive a request for PDN connection from each of the plurality of wireless communication devices associated with the same subscription identifier (e.g., the same IMSI). In some examples, the request may be received during the initial attach. The plurality of wireless communication devices refers to two or more of the wireless communication devices 110a-110e. The plurality of wireless communication devices may include the first wireless communication device 110a and at least one of the second wireless communication devices 110b-110e.

Illustrating with a non-limiting example, each of the plurality of wireless communication devices may send the request for PDN (e.g., a PDN connection request) to the base station 130, and the base station 130 may forward the request to the S-GW 156. In another non-limiting example, the base station 130 may forward the request to the MME 152, and the MME 152 sends the request to the S-GW 156. In either example, the S-GW 156 (e.g., the processor 176) may send the request to the P-GW 158.

At block B420b, at least one processor associated with the network 140 may determine a different IP address for each of the plurality of wireless communication devices. For example, the processor 178 of the P-GW 158 may allocate a unique IP address for each of the plurality of wireless communication devices.

At block B430b, at least one processor associated with the network 140 may send a different IP address to each of the plurality of wireless communication devices. For example, the processor 178 of the P-GW 158 may forward the IP addresses to the S-GW 156, and the S-GW 156 may forward the IP addresses to the base station 130 for relaying to the plurality of wireless communication devices. In some instances, the P-GW 158 may send the IP addresses for the plurality of wireless communication devices to the HSS 154. For example, the P-GW 158 may send the IP addresses to the S-GW 156, and the S-GW 156 may forward the IP address to the MME 152. The MME 152 may store the IP addresses in a memory associated therewith and/or may send the IP address to the HSS 154 for storage.

Figures 5, 6:
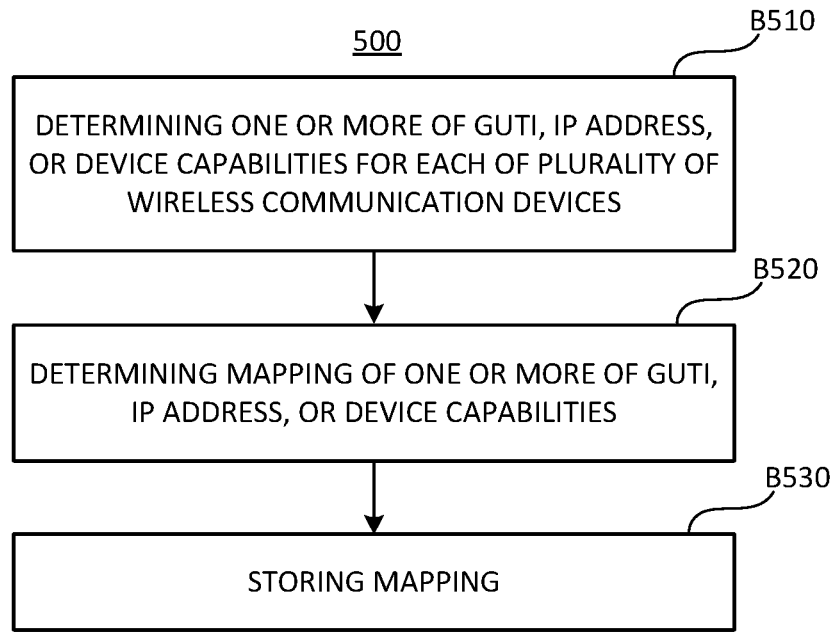
FIG. 5 is a process flowchart diagram illustrating a device identification method according to various examples.
FIG. 6 is a diagram illustrating a mapping table for identifying wireless communication devices having a same subscription identifier according to various examples.

FIG. 5 is a process flowchart diagram illustrating a device identification method 500 according to various examples. Referring to FIGS. 1-5, in some examples, one or more processors (e.g., one or more of the processors 172, 176, or 178) associated with the network 140 (e.g., with the EPC 150) may be capable of performing the device identification method 500. The device identification method 500 may be an example of a particular implementation of block B320. Generally, the device identification method 500 includes determining a correspondence of various parameters (e.g., GUTIs, IP addresses, device capabilities, or the like) to identify different wireless communication devices associated with the same subscription identifier (e.g., the IMSI).

At block B510, at least one processor associated with the network 140 may determine one or more of a GUTI, IP address, or device capabilities for each of the plurality of wireless communication devices. The plurality of wireless communication devices refers to two or more of the wireless communication devices 110a-110e, each of which has a subscription identified by the same IMSI. The plurality of wireless communication devices may include the first wireless communication device 110a and at least one of the second wireless communication devices 110b-110e.

In a non-limiting example, the processor 172 of the MME 152 may allocate a unique GUTI for a wireless communication device during the initial attach. In a non-limiting example, the processor 178 of the P-GW 158 may allocate a unique IP addresses for a wireless communication device during the initial attach. In a non-limiting example, each of the plurality of wireless communication device sends a device capabilities message to the network 140 (e.g., to one or more of the MME 152 or S-GW 156). As such, the GUTI, IP address, and device capabilities may be stored (e.g., by the processor 172 of the MME 152) at an associated memory or transmitted to the HSS 154 for storing at the HSS 154 as subscriber data.

At block B520, at least one processor (e.g., the processor 172 or a processor associated with the HSS 154) associated with the network 140 may determine a mapping of one or more of the GUTI, IP address, or device capabilities for the plurality of wireless communication devices. The mapping may indicate the correspondence of one or more of the GUTI, IP address, or device capabilities to identify each of the plurality of wireless communication devices. The mapping may be stored (e.g., at a memory associated with the MME 154 or at the HSS 154) at block B530.

FIG. 6 is a diagram illustrating a mapping table 600 for identifying wireless communication devices having a same subscription identifier (e.g., a same IMSI) according to various examples. Turning now to FIGS. 1-6, the mapping table 600 depicts a set of parameters, including GUTIs, IP addresses, and device capabilities that uniquely identifies each of the wireless communication devices (e.g., the wireless communication devices 110a-110e) with the same IMSI. For instance, each device (corresponding to a given row) has a same IMSI (e.g., $IMSI_1$). Each device may be allocated a different GUTI (e.g., $GUTI_1$, $GUTI_2$, ..., $GUTI_N$) and a different IP address (e.g., $IP_1$, $IP_2$, ..., $IP_N$). Each device may have an associated device capabilities (e.g., voice-capable, data-capable, or both) reported by each respective device.

Illustrating with a non-limiting example, the first wireless communication device 110a, which may be a voice-enabled smart phone, can be unique identified by a combination of $GUTI_1$, $IP_1$, and voice capabilities and data capabilities. Illustrating with another non-limiting example, the second wireless communication device 110b, which may be a utility meter IoT device, can be unique identified by a combination of $GUTI_2$, $IP_2$, and its data capabilities. The communications to or from each of the plurality of wireless communication devices having the same IMSI may be routed according to correspondence between one or more of the GUTIs, IP addresses, and device capabilities, for example, based on the mapping table 600.

Illustrating with a non-limiting example involving a MO voice call received by the network 140 from the first wireless communication device 110a, the network 140 may determine that a MO voice call associated with $IMSI_1$ is from the device associated with $GUTI_1$ and $IP_1$, given that only such a device is voice-capable according to the mapping table 600. The MO voice call may be routed to a destination party accordingly.

Illustrating with another non-limiting example involving a MT voice call received by the network 140 to be routed to the first wireless communication device 110a, the network 140 (e.g., the processor 172 of the MME 152) may determine that the MT voice call is for the device associated with $GUTI_1$ and $IP_1$, given that only such a device with $IMSI_1$ is voice-capable according to the mapping table 600. The MT call may be routed to the first wireless communication device 110a accordingly.

Illustrating with yet another non-limiting example involving MO data (e.g., IP data packets) received by the network 140 from the second wireless communication device 110b, the network 140 may route the data to a destination party using the unique IP address (e.g., the $IP_2$) allocated to the second wireless communication device 110b during initial attach. For instance, the MO data may be associated with the $IP_2$.

Illustrating with yet another non-limiting example involving MT data (e.g., IP data packets) received by the network 140 to be routed to the second wireless communication device 110b, the processor 178 of the P-GW 158 may route such data to the S-GW 156 based on the destination IP address (e.g., $IP_2$) which is the unique IP address of the second wireless communication device 110b. The processor 172 of the MME 152 and the HSS 154 may manage or otherwise facilitate routing of the data to the corresponding base station (e.g., the base station 130) from the S-GW 156 using $GUTI_2$, which corresponds to $IP_2$ as indicated in the mapping table 600.

As such, instead of relying solely on the IMSI for routing communications, the network 140 can route calls and data based on other parameters such as the GUTIs, IP addresses, device capabilities, or the like as shown in the non-limiting example of the mapping table 600. Given that the MME 152 and the HSS 154 manage the routing of calls and data based on the correspondence stored in the HSS 154, no changes to the base station 130 are needed to implement the arrangements described herein. On the second IoT wireless communication devices 110b-110e, virtual SIMs can be implemented to be programmed with the same subscription information (e.g., the same IMSI and parameters supporting the same subscription). The network operator managing the EPC 150 can provide feasibility of programming with respect to a virtual SIM on an IoT device that share a same subscription with a smart phone, which may have a physical SIM. In addition, the MME 152 can manage authentication of multiple devices having the same IMSI without automatically returning error or failure to authenticate. The MME 152 and the HSS 154 can store multiple GUTIs and corresponding IP addresses mapped to a particular IMSI, as shown in the mapping table 600. Furthermore, routing of IP data packets to each of the second IoT wireless communication devices 110b-110e may be based on a corresponding GUTI (based on the IP address to GUTI mapping shown in the mapping table 600).

Figure 7:
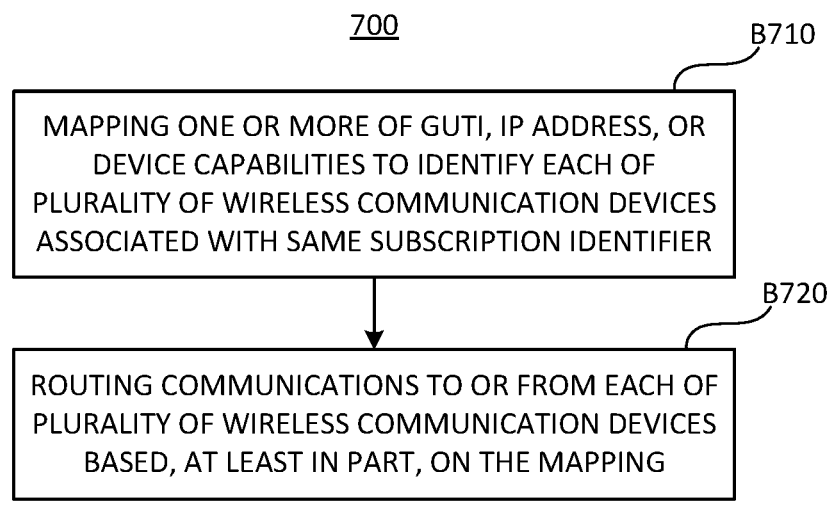
FIG. 7 is process flowchart diagram illustrating a subscription management method according to various examples.

FIG. 7 is a process flowchart diagram illustrating a subscription management method 500 according to various examples. Referring to FIGS. 1-7, in some examples, one or more processors (e.g., one or more of the processors 172, 176, or 178) associated with the network 140 (e.g., with the EPC 150) may be capable of performing the subscription management method 700. Each of blocks shown for FIGS. 3-5 may correspond to one or more of blocks B710 and B720.

At block B710, at least one processor associated with the network 140 may map one or more of the GUTI, IP address, or device capabilities to identify each of the plurality of wireless communication devices associated with the same subscription identifier (e.g., the same IMSI). The mapping table 600 may represent a non-limiting example of such mapping.

At block B720, at least one processor associated with the network 140 may route communications (e.g., MO voice calls, MT voice calls, MO data, MT data, or the like) to or from each of the plurality of wireless communication devices based, at least in part, on the mapping.

Figure 8:
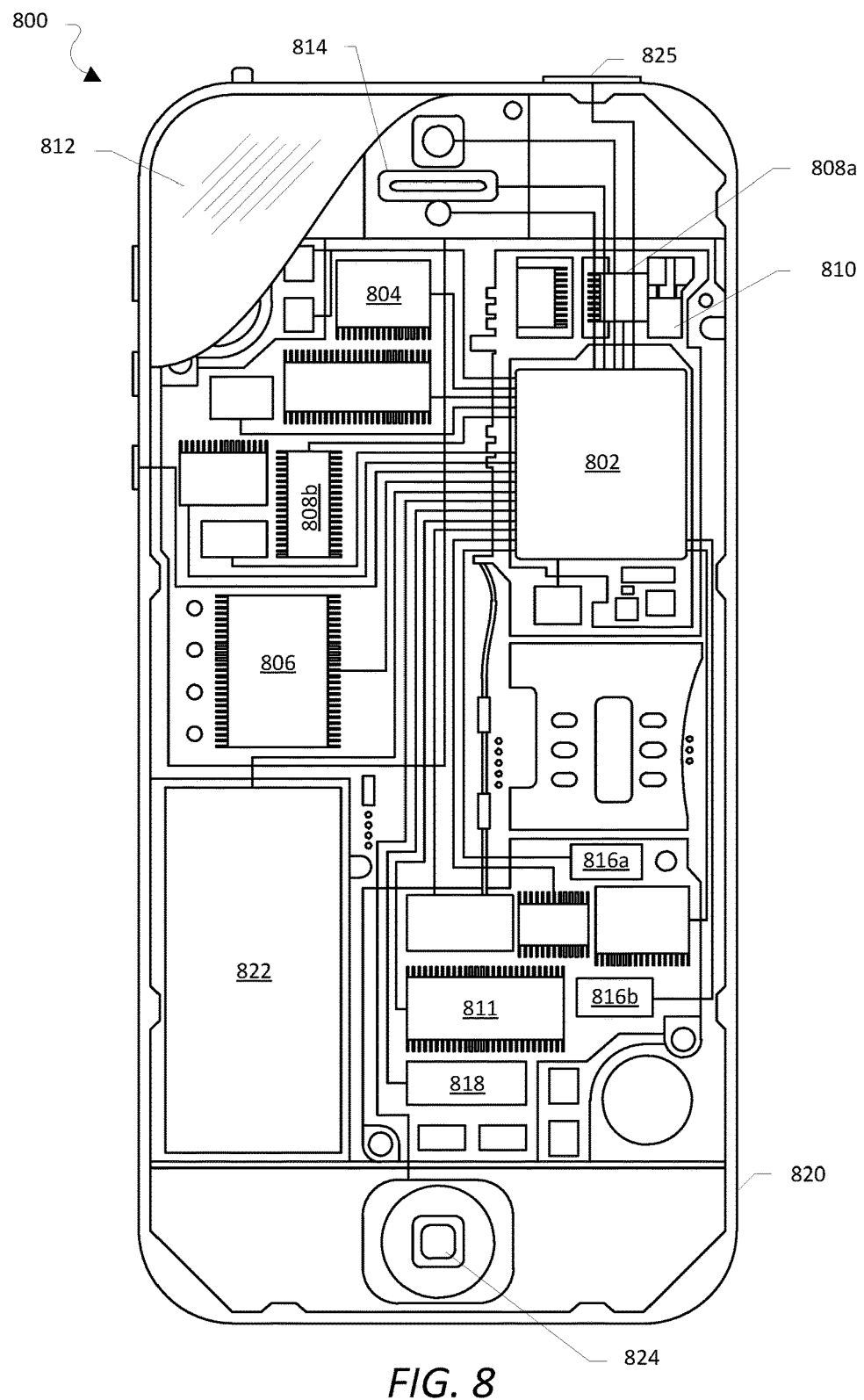
FIG. 8 is a component block diagram of a wireless communication device suitable for use with various examples.

The various examples may be implemented in any of a variety of wireless communication devices 110 and 200, an example of which is illustrated in FIG. 8, as a wireless communication device 800. As such, the wireless communication device 800 may implement the process and/or the apparatus of FIGS. 1-8, as described herein.

With reference to FIGS. 1-8, the wireless communication device 800 may include a processor 802 coupled to a touchscreen controller 804 and an internal memory 806. The processor 802 may be one or more multi-core integrated circuits designated for general or specific processing tasks. The memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the wireless communication device 800 need not have touch screen capability.

The wireless communication device 800 may have one or more cellular network transceivers 808a, 808b coupled to the processor 802 and to at least one antenna 810 and configured for sending and receiving cellular communications. The transceivers 808a, 808b and antenna 810 may be used with the above-mentioned circuitry to implement the various example methods. The cellular network transceivers 808a, 808b may be the RF resource 218. The antenna 810 may be the antenna 220. The wireless communication device 800 may include two or more SIM cards 816a, 816b, corresponding to SIM-1 204a and SIM-2 204b (respectively), coupled to the transceivers 808a, 808b and/or the processor 802. The wireless communication device 800 may include a cellular network wireless modem chip 811 (e.g., the baseband modem processor 216) that enables communication via at least one cellular network and is coupled to the processor 802.

The wireless communication device 800 may include a peripheral device connection interface 818 coupled to the processor 802. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown).

The wireless communication device 800 may also include speakers 814 for providing audio outputs. The wireless communication device 800 may also include a housing 820, constructed of a plastic, metal, or a combination of materials, for containing all or some of the components discussed herein. The wireless communication device 800 may include a power source 822 coupled to the processor 802, such as a disposable or rechargeable battery. The rechargeable battery may also be coupled to a peripheral device connection port (not shown) to receive a charging current from a source external to the wireless communication device 800. The wireless communication device 800 may also include a physical button 824 for receiving user inputs. The wireless communication device 800 may also include a power button 826 for turning the wireless communication device 800 on and off.

The various examples illustrated and described are provided merely as examples to illustrate various features of the claims. However, features shown and described with respect to any given example are not necessarily limited to the associated example and may be used or combined with other examples that are shown and described.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the examples disclosed herein may be implemented or performed with a general purpose processor, a DSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present invention. Various modifications to these examples will be readily apparent to those skilled in the art, and the generic principles defined herein may be applied to some examples without departing from the spirit or scope of the invention. Thus, the present invention is not intended to be limited to the examples shown herein but is to be accorded the widest scope consistent with the following claims and the principles and novel features disclosed herein.

What is claimed is:
1. A method for a network to manage communications for a plurality of wireless communication devices, comprising:

registering, by the network, the plurality of wireless communication devices associated with a same subscription identifier;
determining a mapping of a Globally Unique Temporary User Equipment (UE) Identity (GUTI), Internet Protocol (IP) address and device capabilities associated with each of the plurality of wireless communication devices, based on the same subscription identifier; and
routing, by the network, communications to or from each of the plurality of wireless communication devices based, at least in part, on the determined mapping.

2. The method of claim 1, wherein:
the same subscription identifier is an International Mobile Subscriber Identity (IMSI);
the network comprises an Evolved Packet Core (EPC); and
the network is associated with a processor of at least one of a Mobility Management Entity (MME) or a Home Subscriber Server (HSS).

3. The method of claim 1, wherein registering the plurality of wireless communication devices associated with the same subscription identifier comprises:
determining, during an initial attach, a different GUTI for each of the plurality of wireless communication devices and a different (IP address for each of the plurality of wireless communication devices.

4. The method of claim 1, wherein registering the plurality of wireless communication devices associated with the same subscription identifier comprises:
receiving, by the network, an attach request message from each of the plurality of wireless communication devices, wherein the attach request message comprises the same subscription identifier; and
determining, by the network, a different GUTI for each of the plurality of wireless communication devices.

5. The method of claim 4, further comprising:
sending the different GUTI to each of the plurality of wireless communication devices in an attach accept message, wherein a processor associated with at least one of a Mobility Management Entity (MME) or a Home Subscriber Server (HSS) of the network determines the different GUTI for each of the plurality of wireless communication devices.

6. The method of claim 1, wherein registering the plurality of wireless communication devices associated with the same subscription identifier comprises:
authenticating the plurality of wireless communication devices using a same authentication key associated with the same subscription identifier.

7. The method of claim 1, wherein registering the plurality of wireless communication devices associated with the same subscription identifier comprises:
receiving, by the network, a request for Packet Data Network (PDN) connection from each of the plurality of wireless communication devices; and
determining, by the network, a different IP address for each of the plurality of wireless communication devices.

8. The method of claim 7, further comprising:
for each of the plurality of wireless communication devices, sending the determined IP address for the wireless communication device to the wireless communication device, wherein a processor associated with a PDN Gateway (P-GW) of the network determines the different IP address for each of the plurality of wireless communication devices.

9. The method of claim 1, wherein a first wireless communication device of the plurality of wireless communication devices is both voice-capable and data-capable.

10. The method of claim 1, wherein a second wireless communication device of the plurality of wireless communication devices is data-capable and not voice-capable.

11. The method of claim 10, wherein:
the second wireless communication device includes a virtual SIM associated with the same subscription identifier; and
the second wireless communication device is an Internet-of-Things (IoT) device.

12. The method of claim 1, further comprising:
storing the mapping in a memory associated with at least one of a Mobility Management Entity (MME) or a Home Subscriber Server (HSS) of the network.

13. The method of claim 1, wherein routing the communications to or from each of the plurality of wireless communication devices comprises:
receiving, by the network, a Mobile Originated (MO) voice call from a first wireless communication device of the plurality of wireless communication devices;
determining that the first wireless communication device of the plurality of wireless communication devices is voice-capable while all other wireless communication devices of the plurality of wireless communication devices are not voice-capable; and
routing the MO voice call from the first wireless communication device.

14. The method of claim 1, wherein routing the communications to or from each of the plurality of wireless communication devices comprises:
receiving, by the network, a Mobile Terminated (MT) voice call;
determining, by the network, that a first wireless communication device of the plurality of wireless communication devices is voice-capable while all other wireless communication devices of the plurality of wireless communication devices are not voice-capable;
determining, by the network based on the mapping, one or more of a first GUTI or a first IP address associated with the first wireless communication device; and
routing the MT voice call to the first wireless communication device using one or more of the first GUTI or first IP address.

15. The method of claim 1, wherein routing the communications to or from each of the plurality of wireless communication devices comprises:
receiving, by the network, a Mobile Originated (MO) data transfer from a second wireless communication device of the plurality of wireless communication devices, wherein the data transfer is associated with a second IP address; and
routing the MO data transfer from the second wireless communication device using the second IP address.

16. The method of claim 1, wherein routing the communications to or from each of the plurality of wireless communication devices comprises:
receiving, by the network, a Mobile Terminated (MT) data transfer associated with a second IP address;
determining, by the network, a second GUTI based at least in part on the second IP address; and
routing the MT data transfer to a second wireless communication device of the plurality of wireless communication devices using one or more of the second GUTI or second IP address.

17. A device for managing communications for a plurality of wireless communication devices, comprising:
a processor; and
a memory storing instructions that, when executed by the processor, causes the device to:
register the plurality of wireless communication devices associated with a same subscription identifier;
determine a mapping of a Globally Unique Temporary User Equipment (UE) Identity (GUTI), Internet Protocol (IP) address and device capabilities associated with each of the plurality of wireless communication devices, based on the same subscription identifier; and
route communications to or from each of the plurality of wireless communication devices based, at least in part, on the determined mapping.

18. A method for a network to manage communications for a plurality of wireless communication devices, comprising:
mapping, by the network, a Globally Unique Temporary User Equipment (UE) Identity (GUTI), Internet Protocol (IP) address, and device capabilities to identify each of the plurality of wireless communication devices associated with a same subscription identifier, wherein the plurality of wireless communication devices are registered with the network with the same subscription identifier; and
routing, by the network, communications to or from each of the plurality of wireless communication devices based, at least in part, on the mapping.

19. The method of claim 18 further comprising:
determining, during an initial attach, a different GUTI for each of the plurality of wireless communication devices and a different IP address for each of the plurality of wireless communication devices.

20. The method of claim 18, further comprising:
receiving, by the network, an attach request message from each of the plurality of wireless communication devices, wherein the attach request message comprises the same subscription identifier; and
determining, by the network, a different GUTI for each of the plurality of wireless communication devices.

21. The method of claim 20, wherein registering the plurality of wireless communication devices associated with the same subscription identifier further comprises:
authenticating the plurality of wireless communication devices using a same authentication key associated with the same subscription identifier.

22. The method of claim 18, further comprising registering the plurality of wireless communication devices associated with the same subscription identifier comprising:
receiving, by the network, a request for Packet Data Network (PDN) connection from each of the plurality of wireless communication devices; and
determining, by the network, a different IP address for each of the plurality of wireless communication devices.

23. The method of claim 18, wherein the device capabilities associated with each of the plurality of wireless communication devices comprises voice capabilities and data capabilities.

24. The method of claim 18, further comprising determining at least one of a Paging Occasion (PO) or Paging Frame (PF) based on the GUTI.

25. A network system for managing communications for a plurality of wireless communication devices, comprising:

a database configured to store a mapping of a Globally Unique Temporary User Equipment (UE) Identity (GUTI), an Internet Protocol (IP) address, and device capabilities to identify each of the plurality of wireless communication devices associated with a same subscription identifier, wherein the plurality of wireless communication devices are registered with a network with same subscription identifier; and a processor configured to route communications to or from each of the plurality of wireless communication devices based, at least in part, on the mapping.

26. The device of claim 17, wherein execution of the instructions causes the device to further:

register the plurality of wireless communication devices associated with the same subscription identifier.

27. The device of claim 26, wherein execution of the instructions causes the device to further:

receive an attach request message from each of the plurality of wireless communication devices, wherein the attach request message comprises the same subscription identifier; and determine a different GUTI for each of the plurality of wireless communication devices.

28. The device of claim 17, wherein the same subscription identifier is an International Mobile Subscriber Identity (IMSI).

29. The device of claim 17, wherein execution of the instructions causes the device to further:

authenticate the plurality of wireless communication devices using a same authentication key associated with the same subscription identifier.

\* \* \* \* \*